United States Patent
Alam et al.

(10) Patent No.: US 8,866,340 B2
(45) Date of Patent: Oct. 21, 2014

(54) SUPERCAPACITOR-BASED GRID FAULT RIDE-THROUGH SYSTEM

(75) Inventors: M. Ahsanul Alam, Hafr Al-Batin (SA); A. H. M. A. Rahim, Dhahran (SA); Mohammad Ali Abido, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 734 days.

(21) Appl. No.: 13/100,933

(22) Filed: May 4, 2011

(65) Prior Publication Data

US 2012/0280569 A1 Nov. 8, 2012

(51) Int. Cl.
*H02J 3/28* (2006.01)
*H02J 3/32* (2006.01)
*H02J 3/38* (2006.01)

(52) U.S. Cl.
CPC .. *H02J 3/32* (2013.01); *Y02E 40/16* (2013.01); *Y02E 70/30* (2013.01); *F05B 2270/10711* (2013.01); *Y02E 10/763* (2013.01); *H02J 3/386* (2013.01)
USPC .......................................................... 307/60

(58) Field of Classification Search
CPC ........................................................ H02J 3/28
See application file for complete search history.

(56) References Cited

U.S. PATENT DOCUMENTS

| | | | | |
|---|---|---|---|---|
| 6,137,187 A * | 10/2000 | Mikhail et al. | ........... | 290/44 |
| 6,239,997 B1 * | 5/2001 | Deng | ............ | 363/95 |
| 6,787,933 B2 * | 9/2004 | Claude et al. | ........... | 290/52 |
| 6,870,279 B2 * | 3/2005 | Gilbreth et al. | .......... | 290/52 |
| 7,042,110 B2 * | 5/2006 | Mikhail et al. | ........... | 290/44 |
| 7,166,928 B2 * | 1/2007 | Larsen | ............ | 290/55 |
| 7,233,129 B2 * | 6/2007 | Erdman et al. | ........... | 322/17 |
| 7,339,355 B2 | 3/2008 | Erdman et al. | | |
| 7,432,686 B2 | 10/2008 | Erdman et al. | | |
| 7,535,120 B2 | 5/2009 | Erdman et al. | | |
| 8,120,932 B2 * | 2/2012 | Folts et al. | ............ | 363/37 |
| 2003/0015873 A1 * | 1/2003 | Khalizadeh et al. | ........ | 290/7 |
| 2003/0151259 A1 * | 8/2003 | Feddersen et al. | ........ | 290/44 |
| 2005/0012339 A1 * | 1/2005 | Mikhail et al. | ........... | 290/44 |
| 2005/0122083 A1 * | 6/2005 | Erdman et al. | ........... | 322/20 |
| 2008/0106098 A1 * | 5/2008 | Miller et al. | ............ | 290/44 |
| 2008/0143112 A1 | 6/2008 | Sun | | |
| 2008/0157529 A1 * | 7/2008 | Rivas et al. | ............. | 290/44 |
| 2010/0002475 A1 | 1/2010 | Folts et al. | | |
| 2011/0057444 A1 | 3/2011 | Dai et al. | | |

OTHER PUBLICATIONS

M. M Ahsanul Alam and A.H.M.A. Rahim, "Dynamic Impact of Wind Generation System on Multi-machine Power System", 3rd Int. Conf. on Modeling, Simulation & Applied Optimization (ICMSAO'09), Sharjah, Jan. 2009.*

(Continued)

*Primary Examiner* — Rexford Barnie
*Assistant Examiner* — Elim Ortiz
(74) *Attorney, Agent, or Firm* — Richard C. Litman (57) ABSTRACT

The supercapacitor-based grid fault ride-through system provides a dynamic model of a wind generation system including a Voltage Source Converter (VSC), which functions as a Static Compensator (STATCOM). The power control capability of the STATCOM is extended by incorporating energy stored in a supercapacitor. The system implements a vector control technique based on the decoupling of real and reactive power. Simulation results show that a fixed speed induction generator is capable of withstanding a significant grid fault when aided by the supercapacitor-based grid fault ride-through system. Moreover, the induction generator regains its pre-fault status immediately after the fault is cleared.

4 Claims, 8 Drawing Sheets

(56) References Cited

OTHER PUBLICATIONS

A.H.M.A. Rahim and M. Ahsanul Alam "Fast Low-Voltage-Ride-Through of Wind Generation Systems Using Supercapacitor Based Energy Storage Systems", Int. Conf. on Modeling, Simulation and Applied Optimization 2011(ICMSAO 2011), Apr. 19-21, 2011, Kuala Lumpur, Malaysia.*

A.H.M.A. Rahim, M. Ahsanul Alam, Ibrahim El Amin, M.A. Abido, Z. Al-Hamouz, Belhadj C.A., and M. Kassas, "Voltage stability control of a wind generation system", IEEE Int. Energy Conf Energycon 2010, Manama, Bahrain, Dec. 18-22, 2010.*

M. Ahsanul Alam, A.H.M.A. Rahim, and M. A. Abido, "Supercapacitor based Energy Storage System for effective fault ride through of wind generation system", IEEE Symposium on Industrial Electronics, Bari, Italy, Jun. 2010.*

* cited by examiner

Fig. 13 ic fault ride-through capability of a wind power generation system.
2. Description of the Related Art

SUPERCAPACITOR-BASED GRID FAULT RIDE-THROUGH SYSTEM

BACKGROUND OF THE INVENTION

1. Field of the Invention

The present invention relates generally to electrical power conversion, and particularly to a supercapacitor-based grid fault ride-through system that enhances grid fault ride-through capability of a wind power generation system.

2. Description of the Related Art

The increased level of wind penetration into the power system has resulted in the revision of Grid Codes for wind generators in many countries. Grid codes issued during the last few years invariably demand that wind farms must withstand voltage dips to a certain percentage of the nominal voltage (down to 0% in some cases) and for a specified duration. Such requirements are known as Fault Ride Through (FRT) or Low Voltage Ride Through (LVRT), and are described by a voltage vs. time characteristic curve.

The FRT requirements also include fast active and reactive power restoration to the pre-fault values after the system voltage returns to normal operation levels. Some codes impose increased reactive power generation by the wind turbines during the disturbance in order to provide voltage support. Nevertheless, the wind parks are required to behave, in principle, like other generators, e.g., conventional generating units.

Induction generators (IGs) are widely used as wind generators since they are relatively inexpensive, rigid, and require low maintenance. Although variable-speed wind turbines (WTs) are getting popularity, statistics show that a significant percentage of the total installations are of fixed-speed WTs with cage-rotor IG. But this kind of generator consumes a large amount of reactive power during normal operating conditions. This consumption jumps sharply upon the occurrence of grid fault due to a large increase in slip. Instability in induction generator terminal voltage emerges from the deficiencies in the supply of demanded reactive power during the transient period.

Solutions that have been suggested to prevent voltage collapse after the faults include dynamic reactive power sources, i.e., a static reactive volt-ampere compensator (SVC) or a static synchronous compensator (STATCOM). But a common STATCOM does not have the capability of active power compensation because the DC capacitor with it is not a bulk storage device. It can only affect the active power flow in the power system indirectly by regulating the voltage at the common point of connection with the transmission line. A STATCOM with a braking resistor or a battery energy storage system (BESS) have also been proposed for the stability enhancement of a large wind farm. To have short-term active and reactive power exchange ability during disturbance, power electronics-based energy capacitor system (ECS) has also been proposed recently. The two most promising short-term energy storage devices suitable for wind energy applications are flywheels and supercapacitors.

Thus, a supercapacitor-based grid fault ride-through system solving the aforementioned problems is desired.

SUMMARY OF THE INVENTION

The supercapacitor-based grid fault ride-through system provides a dynamic model of a wind generation system, including a Static Synchronous Compensator (STATCOM). The power control capability of the STATCOM is extended by incorporating energy stored in a supercapacitor. The system implements a vector control technique based on the decoupling of real and reactive power. Simulation results show that a fixed speed induction generator is capable of withstanding a significant grid fault when aided by the supercapacitor-based grid fault ride-through system. Moreover, the induction generator regains its pre-fault status immediately after the fault is cleared. Supercapacitors have high power density, present good efficiency, and have a much higher life cycle than batteries. In addition, their manufacturing cost is decreasing rapidly.

We consider a two-mass model of a wind-generator's drive-train system, and develop a complete model of a STATCOM/supercapacitor-based (SESS-based) grid fault ride-through system. The real power (P)-reactive power (Q) control of the SESS-based grid fault ride-through system is decoupled. Due to the STATCOM's fast reactive power control capability and the supercapacitor's quick charge and discharge properties, the control strategy of the supercapacitor-based grid fault ride-through system demonstrates very good potential to make a fixed speed wind generator grid code compliant.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

It will be understood that the diagrams in the Figures depicting the supercapacitor-based grid fault ride-through system are exemplary only. The control processes and circuitry defined herein may be embodied in a dedicated electronic device having a microprocessor, microcontroller, digital signal processor, application specific integrated circuit, field programmable gate array, any combination of the aforementioned devices, or other analog or digital device that combines the functionality of the supercapacitor-based grid fault ride-through system on discrete components, a single chip or multiple chips configured to carry out the control processes described herein.

Moreover, the control processes may be embodied in a general purpose computer having the appropriate peripherals attached thereto and software stored on non-transitory computer readable media, such as hard drives, programmable memory chips, floppy disks, USB drives, and the like, that can be loaded into main memory and executed by a processing unit to carry out the functionality and steps of the control processes.

The supercapacitor-based grid fault ride-through system provides a dynamic model of a wind power generation system including a Static Synchronous Shunt Compensator (STATCOM). The power control capability of the STATCOM is extended by incorporating energy stored in a supercapacitor. The system implements a vector control technique based on the decoupling of real and reactive power. Simulation results show that a fixed speed induction generator is capable of withstanding a significant grid fault when aided by the supercapacitor-based grid fault ride-through system. Moreover, the induction generator regains its pre-fault status immediately after the fault is cleared.

Figure 1:
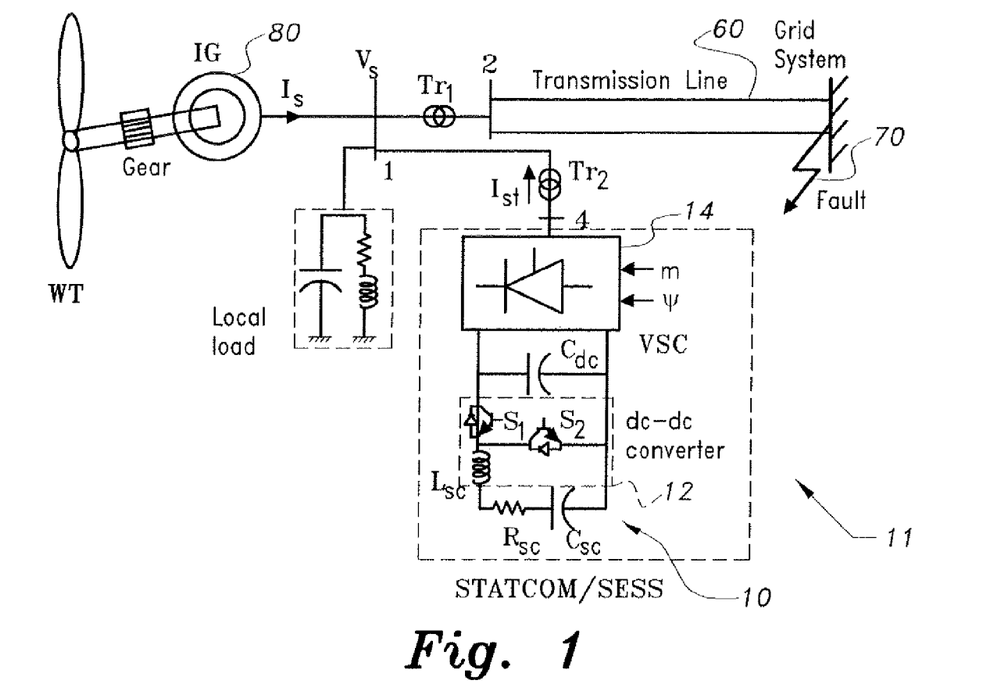
FIG. 1 is a schematic diagram of a wind power generation system incorporating a supercapacitor-based grid fault ride-through system according to the present invention.

FIG. 1 shows the fixed speed wind turbine cage-generator configuration. The configuration includes a horizontal axis wind-generator 80 connected to a power grid through a step-up transformer ($Tr_1$) and a double circuit transmission line 60. A capacitor bank is used at the generator terminal (bus 1) for reactive power compensation of the induction generator at steady state, A voltage source converter (VSC)-DC link capacitor combination 14 (STATCOM) is connected at the generator terminal through a step-down transformer ($Tr_2$). The supercapacitor-based grid fault ride-through system 10 includes a DC-DC converter 12 and supercapacitor $C_{sc}$. The system 10 is connected across the dc-link capacitor $C_{dc}$ of the STATCOM 14 to make up the STATCOM/SESS 11. The models for the different components of the wind-generator system are given in the following:

In the wind turbine model, the mechanical power output of a wind turbine is related to the wind speed $V_\omega$ by:

$$P_m = \frac{1}{2}\rho A C_p(\lambda, \beta) V_w^3. \tag{1}$$

Here, $\rho$ is the air density and A is the area swept by the turbine blades. The power coefficient $C_p(\lambda,\beta)$ depends on both the blade pitch angle $\beta$ and the tip speed ratio defined as:

$$\lambda = \frac{\Omega R}{V_w}. \tag{2}$$

where R is wind turbine rotor radius and $\Omega$ is the mechanical angular velocity. An expression for $C_p$ is given by:

$$C_p(\lambda, \beta) = 0.5176\left(\frac{116}{\lambda_i} - 0.4\beta - 5\right)e^{\frac{-21}{\lambda_i}} + 0.00068\lambda \tag{3}$$

where $$\frac{1}{\lambda_i} = \frac{1}{\lambda + 0.08\beta} - \frac{0.035}{\beta^3 + 1}.$$

In the Induction Generator (IG) and Drive-train model the induction generator is modeled as an equivalent voltage source, $E'=e'_d+je'_q$, behind the transient impedance, $Z'=R_s+jx'$. For drive-train, two-mass model is adopted here as much higher inertia wind turbine rotor is connected to the low inertia IG rotor with a relatively soft shaft. Essentially, the whole system is represented through a set of differential-algebraic equations of the form:

$$\dot{x}=f(x,z)$$

$$0=g(x,z), \tag{4}$$

where $x=[e'_d, e'_q, \omega_r, \omega_t, \theta_s]$ and $z=[i_{ds}, i_{qs}, v_{ds}, v_{qs}, P_m]$. The stator voltages and currents are related through:

$$\left.\begin{array}{l}v_{ds} = -R_s i_{ds} + x' i_{qs} + e'_d \\ v_{qs} = -R_s i_{qs} - x' i_{ds} + e'_q\end{array}\right\}. \tag{5}$$

The electromagnetic torque is computed as:

$$T_e = e'_d i_{ds} + e'_q i_{qs} \tag{6}$$

The subscripts d and q stand for direct and quadrature axis values normalized in per unit (p.u.), respectively.

Figure 2:
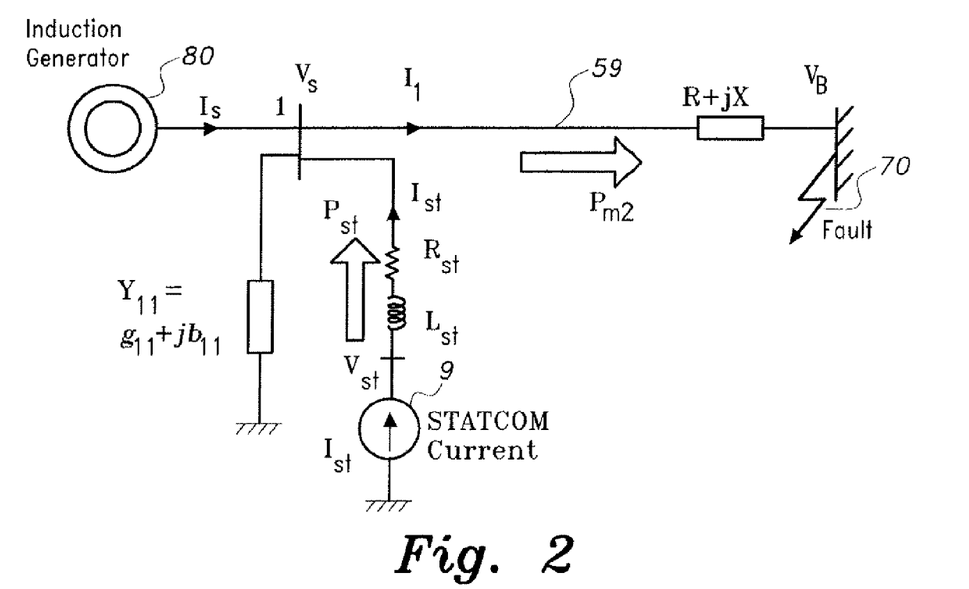
FIG. 2 is a schematic diagram showing a load line model of the supercapacitor-based grid fault ride-through system according to the present invention.

In the transmission line and load model shown in FIG. 2, $V_s$, and $V_B$ represent terminal voltage and infinite bus voltage, respectively, of the wind induction generator IG 80. Z=(R+jX) is the impedance 59 of transmission line 60 of FIG. 1, including the transformer $Tr_1$. The induced grid fault 70 occurs at end of the transmission line distal from the wind induction generator IG 80. The STATCOM current 9 completes the load line model of the system 10. Compensating capacitor and the local load are lumped together and are represented by the admittance term $Y_{11}=g_{11}+jb_{11}$. Induction generator terminal voltage is given by:

$$V_s=V_B+(R+jX)(I_s+I_{st}-V_s(g_{11}+jb_{11})) \tag{7}$$

where $I_{st}$ is the current injected by the static compensator-supercapacitor energy storage system (SESS-based grid fault ride-through system 11).

Writing currents and voltages of (7) in terms of their d-q components, equations (5) and (7) can be solved for $i_{ds}$ and $i_{qs}$ as:

$$\begin{bmatrix}i_{ds}\\i_{qs}\end{bmatrix} = [K_1]\begin{bmatrix}e'_d\\e'_q\end{bmatrix} + [K_2]\begin{bmatrix}i_{std}\\i_{stq}\end{bmatrix} + [K_3]\begin{bmatrix}V_{Bd}\\V_{Bq}\end{bmatrix} \tag{8}$$

where, $K_1$, $K_2$ and $K_3$ are matrices whose elements are the system's impedance and admittance parameters, respectively.

In the Supercapacitor and STATCOM model 10, the supercapacitor is modeled as an ideal capacitance and an equivalent series resistance (ESR). The ESR is shown in FIG. 1 as $R_{sc}$, and accounts for resistive losses in the dielectric, plate material, and electrolytic solution.

The STATCOM 14 is modeled as a controllable voltage source $V_{st}$. The dynamic voltage-current relationship of the STATCOM 14 including the converter transformer $Tr_2$ is obtained from:

$$L_{st}\frac{dI_{st}}{dt} + R_{st}I_{st} = V_{st} - V_s \quad (9)$$

Here, $R_{st}$ and $L_{st}$ are the resistance and inductance of STATCOM 14, including the converter transformer. Equation (9) can be broken-up to a synchronously rotating d-q reference frame and, including the dynamics of the dc link voltage $V_{dc}$, the STATCOM—Supercapacitor Energy Storage System 11 can be modeled as:

$$\frac{di_{std}}{dt} = \omega_b\left(-\frac{R_{st}}{L_{st}}i_{std} + \frac{\omega}{\omega_b}i_{stq} + \frac{mV_{dc}}{L_{st}}\cos(\psi + \theta_s) - \frac{V_s}{L_{st}}\cos\theta_s\right) \quad (10)$$

$$\frac{di_{stq}}{dt} = \omega_b\left(-\frac{\omega}{\omega_b}i_{std} - \frac{R_{st}}{L_{st}}i_{stq} + \frac{mV_{dc}}{L_{st}}\sin(\psi + \theta_s) - \frac{V_s}{L_{st}}\sin\theta_s\right) \quad (11)$$

$$\frac{dV_{dc}}{dt} = -\frac{m}{C_{dc}}(i_{std}\cos(\psi + \theta_s) + i_{stq}\sin(\psi + \theta_s)) - \frac{D_r I_{sc}}{C_{dc}} \quad (12)$$

where m and $\Psi$ are the modulation index and phase angle defined by VSC pulse width modulation (PWM), respectively, and $I_{sc}$ is the supercapacitor current, and $D_r$ is the dc-dc converter duty ratio. The supercapacitor voltage Vsc is given by:

$$V_{sc} = E_{sc} + R_{sc}I_{sc}; \text{ with } I_{sc} = C_{sc}\frac{dE_{sc}}{dt} \quad (13)$$

The algebraic equations and differential equations from (1) to (12) represent a complete model of a wind generator integrated with a SESS-based grid fault ride-through system.

Regarding control of the STATCOM 14, more specifically, the decoupled P-Q control, the complex power injected by the STATCOM, $S = (V_s e^{j\theta})I_{st}^*$, gives:

$$P_{st} = V_s \cos\theta_s i_{std} + V_s \sin\theta_s i_{stq}$$

$$Q_{st} = V_s \sin\theta_s i_{std} - V_s \cos\theta_s i_{stq} \quad (14)$$

The decoupled P-Q control strategy is obtained by defining a new set of STATCOM currents:

$$I_{st}^{new} = I_{st} e^{-j\theta_s} \quad (15)$$

This makes:

$$P_{st} = V_s i_{std}^{new}; \quad Q_{st} = -V_s i_{stq}^{new} \quad (16)$$

$P_{st}$ and $Q_{st}$ can then be controlled independently by $i_{std}^{new}$ and $I_{stq}^{new}$. Equations (10)-(11) can be rewritten as:

$$\frac{d}{dt}\begin{bmatrix} i_{std}^{new} \\ i_{stq}^{new} \end{bmatrix} = \omega_b \begin{bmatrix} -\frac{R_{st}}{L_{st}} & 0 \\ 0 & -\frac{R_{st}}{L_{st}} \end{bmatrix} \begin{bmatrix} i_{std}^{new} \\ i_{stq}^{new} \end{bmatrix} + \begin{bmatrix} x_1 \\ x_2 \end{bmatrix} \quad (17)$$

where $$\begin{bmatrix} x_1 \\ x_2 \end{bmatrix} = \omega_b \begin{bmatrix} \frac{\omega}{\omega_b}i_{stq}^{new} + \frac{mV_{dc}}{L_{st}}\cos\psi - \frac{V_s}{L_{st}} \\ -\frac{\omega}{\omega_b}i_{std}^{new} + \frac{mV_{dc}}{L_{st}}\sin\psi \end{bmatrix} \quad (18)$$

Defining $e_{xd} = mV_{dc}\cos\Psi$ and $e_{xq} = mV_{dc}\sin\Psi$, equation (18) can be rewritten as:

$$e_{xd} = \frac{L_{st}}{\omega_b}(x_1 - \omega i_{stq}^{new}) + V_m; \text{ and } e_{xq} = \frac{L_{st}}{\omega_b}(x_2 + \omega i_{std}^{new}) \quad (19)$$

$$m = \frac{\sqrt{e_{xd}^2 + e_{xq}^2}}{V_{dc}} \text{ and } \Psi = \tan^{-1}\left(\frac{e_{xq}}{e_{xd}}\right) \quad (20)$$

Equation (17) shows that $i_{std}$ and $i_{stq}$(new) respond to $x_1$ and $x_2$, respectively, through a simple first-order transfer function, proving decoupled control of $i_{std}$ and $i_{stq}$. The control rule is thus completed by defining the feedback loops and PI compensation as follows:

$$x_1 = \left(k_{p1} + \frac{k_{i1}}{s}\right)(i_{std}^{ref} - i_{std}) \text{ and } x_2 = \left(k_{p2} + \frac{k_{i2}}{s}\right)(i_{stq}^{ref} - i_{stq}) \quad (21)$$

The inverter voltage vector is controlled through the m and $\Psi$ defined in equation (20). A block diagram of the control scheme 300 is presented in FIG. 3.

Figure 3:
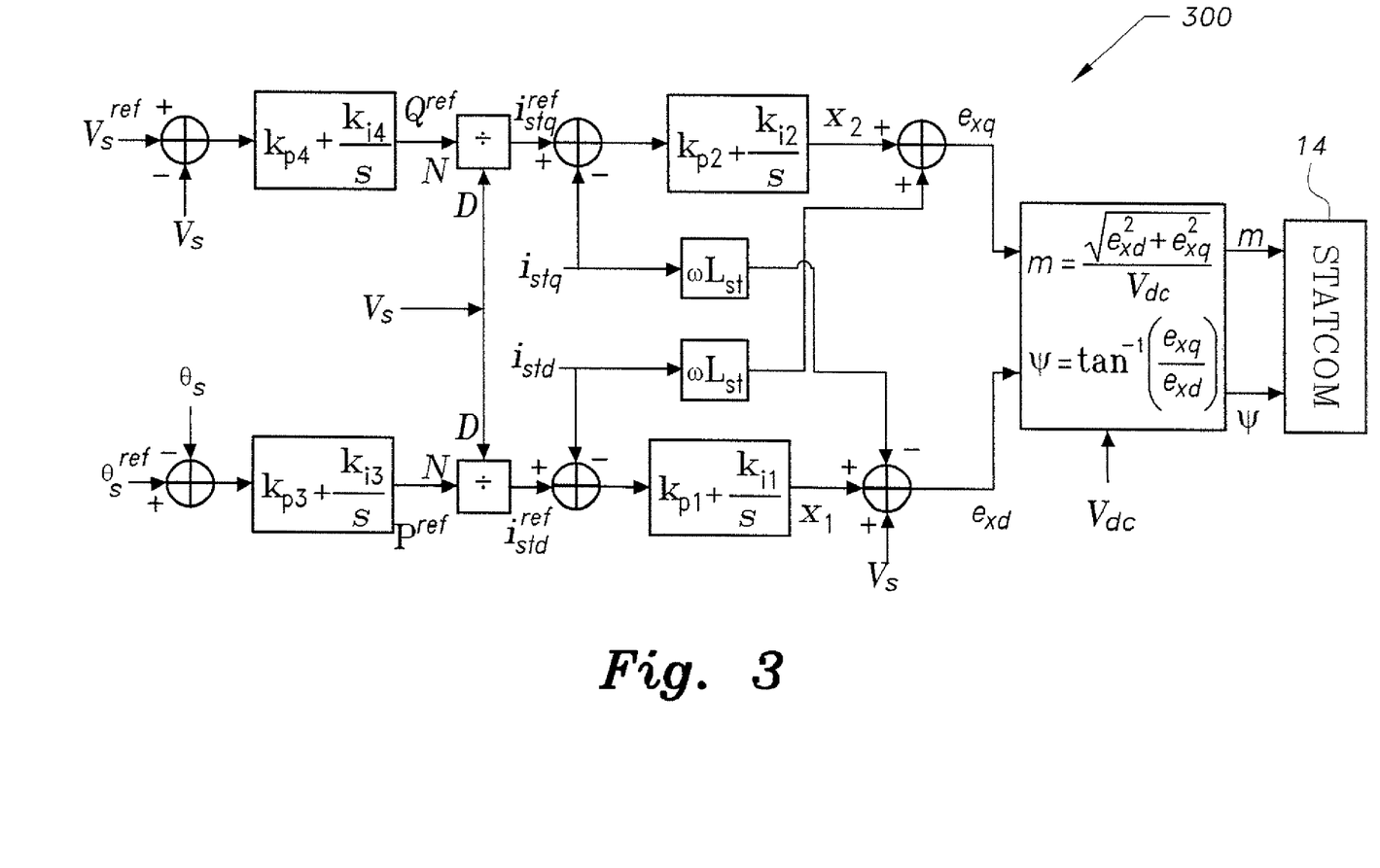
FIG. 3 is a block diagram of a decoupled controller used in the supercapacitor-based grid fault ride-through system according to the present invention.

With respect to generation of $P^{ref}$ and $Q^{ref}$ for the STATCOM, the control objectives include: (i) regulation of voltage at bus 1 by injecting/absorbing required reactive power, and (ii) minimizing real power variations in $P_{m2}$. $Q^{ref}$ is generated by sensing the deviation of voltage magnitude at bus 1, i.e., $(V_s^{ref} - V_s)$ where $V_s^{ref}$ is the pre-disturbance voltage magnitude. Similarly, $P^{ref}$ is generated by sensing the deviation of bus voltage angle, i.e., $(\theta_s^{ref} - \theta_s)$, where $\theta_s^{ref}$ is the pre-disturbance bus voltage angle. PI controllers are used to ensure zero steady-state error. FIG. 3 shows the generation of $P^{ref}$ and $Q^{ref}$. Corresponding $i_{std}^{ref}$ and $i_{stq}^{ref}$ are generated using equation (16).

Figure 4:
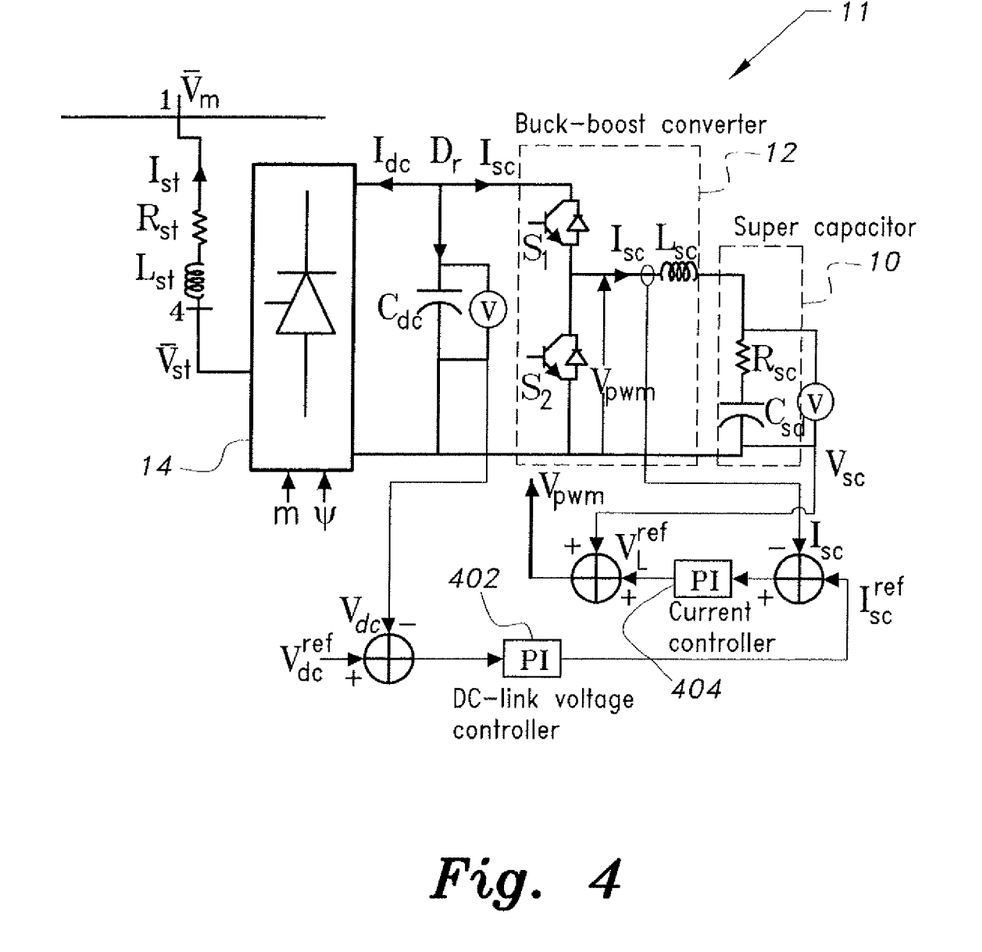
FIG. 4 is a block diagram of a bidirectional DC-DC control system of the supercapacitor-based grid fault ride-through system according to the present invention.

In the DC-DC converter-control system, a bidirectional DC-DC converter 12 (most clearly shown in FIG. 4) includes switching components $S_1$ and $S_2$ for controlling the charge and discharge of the supercapacitors $C_{sc}$. Exemplary bidirectional DC-DC converter 12, shown in FIG. 4, is a buck-boost converter and operates in 'Buck Mode' to recharge the supercapacitors $C_{sc}$, whereas 'Boost Mode' transfers the stored energy to the DC link, maintaining the DC link voltage $V_{dc}$ constant during real power delivery. FIG. 4 shows the main circuit of the bidirectional DC-DC converter 12, which includes three energy storage components, i.e., the DC-link capacitor ($C_{dc}$), the choke ($L_{sc}$) and the supercapacitors ($C_{sc}$). Among the objectives of the control are: (i) to regulate the DC-link voltage with energy stored in the supercapacitor, and (ii) to keep the supercapacitor voltage $V_{sc}$ in its desired operating range. These are achieved through the use of DC-link voltage controller 402, and SC current controller 404. The measured DC-link voltage is compared to the reference $V_{dc}^{ref}$, and the error is taken into the PI voltage controller, which outputs the reference currents $I_{sc}^{ref}$. The voltage reference for the converter $V_{pwm}^{ref}$ is obtained as the sum of SC voltage $V_{sc}$ and the inductor voltage reference $V_L^{ref}$ obtained from the current loop PI controller 404. The response of current controller 404 must be fast enough, with good reference tracking capability. Following design procedure known in the art, the gain values of the current controller 404 are calculated.

Figure 5:
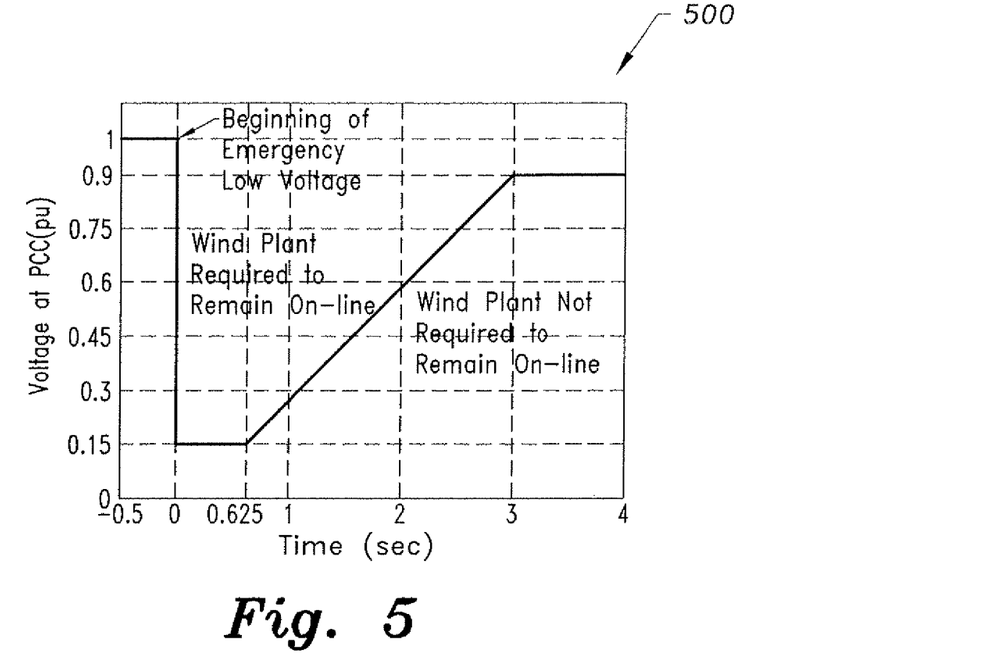
FIG. 5 is a plot of the low voltage ride through standard set by FERC.

Simulations were carried out to satisfy Low Voltage Ride Through (LVRT) requirements issued by U.S. Federal Energy Regulatory Commission (FERC). This code stipulates that the wind generator has to remain connected to the power system if the voltage remains at a level greater than 15% of the nominal voltage for a period that does not exceed 0.625 seconds, as shown in plot 500 of FIG. 5. For comparison, no control, Q control only, and both P & Q control using the SESS-based grid fault ride-through system 10 are considered.

Figure 6:
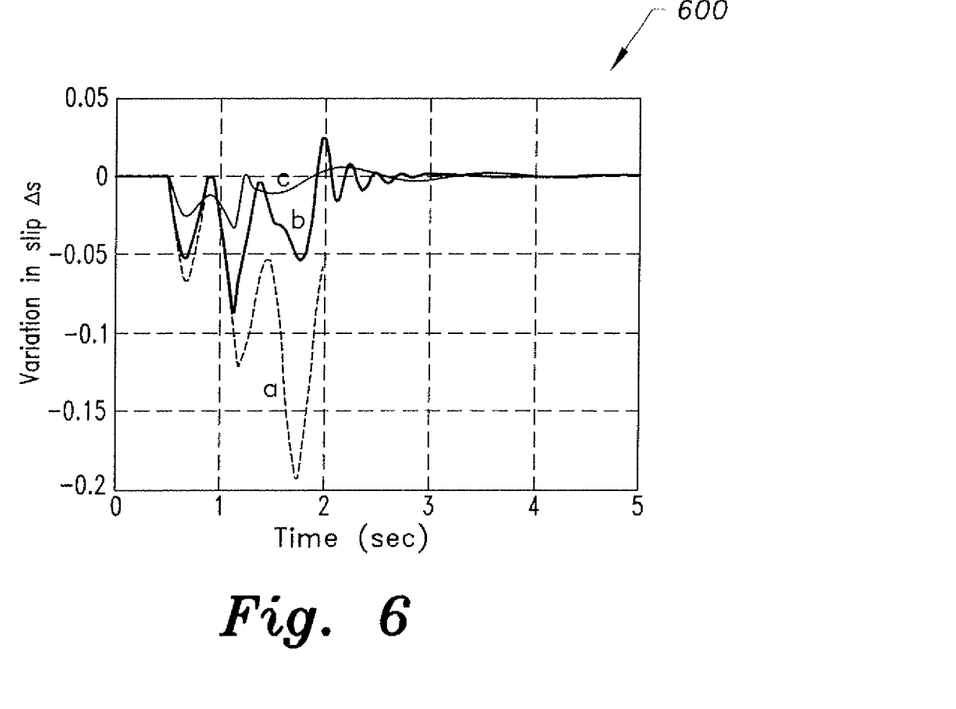
FIG. 6 is a plot showing variations in slip deviation.
Figure 7:
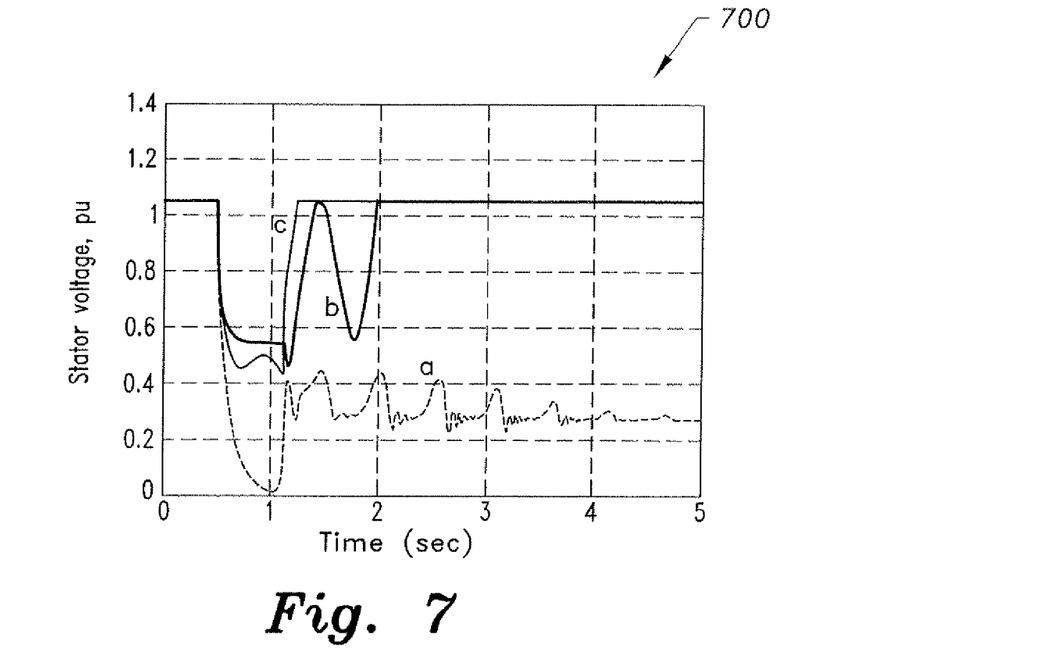
FIG. 7 is a plot showing terminal voltage variation.
Figure 8:
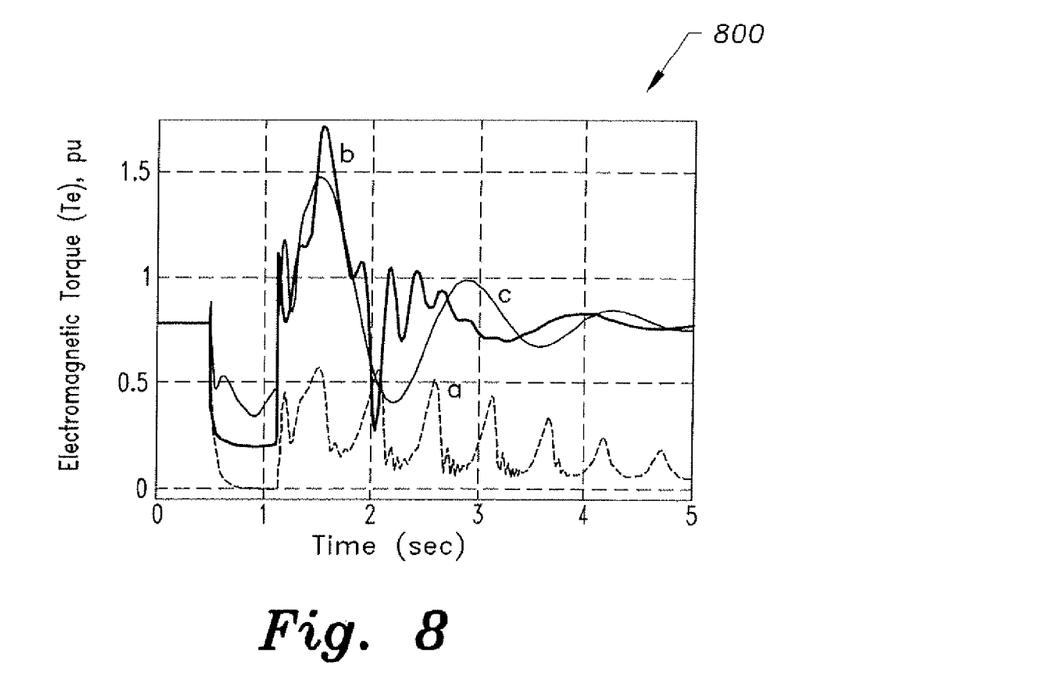
FIG. 8 is a plot showing torque variation.

A bolted three-phase fault at the grid connection point is simulated. The fault is cleared after 625 ms. The transient responses are shown in plots 600, 700, and 800 of FIGS. 6-8, respectively, for a nominal loading of 75%. They display the changes in generator slip (Δs), stator voltage variations, and variations in electromagnetic torque developed, respectively. The uncontrolled system response is unstable. During the fault, the induction generator rotor accelerates, and the terminal voltage and flux collapse. When the fault is cleared, it requires extra reactive power support for quick recovery of its flux and terminal voltage. In the absence of such support, it fails to recover its terminal voltage, as can be seen in FIG. 7. The slip continues to increase as the decelerating torque becomes negligible. In this situation, a protective system (either over-speed protection or under-voltage protection) temporarily isolates the wind generator from the grid.

Figure 9:
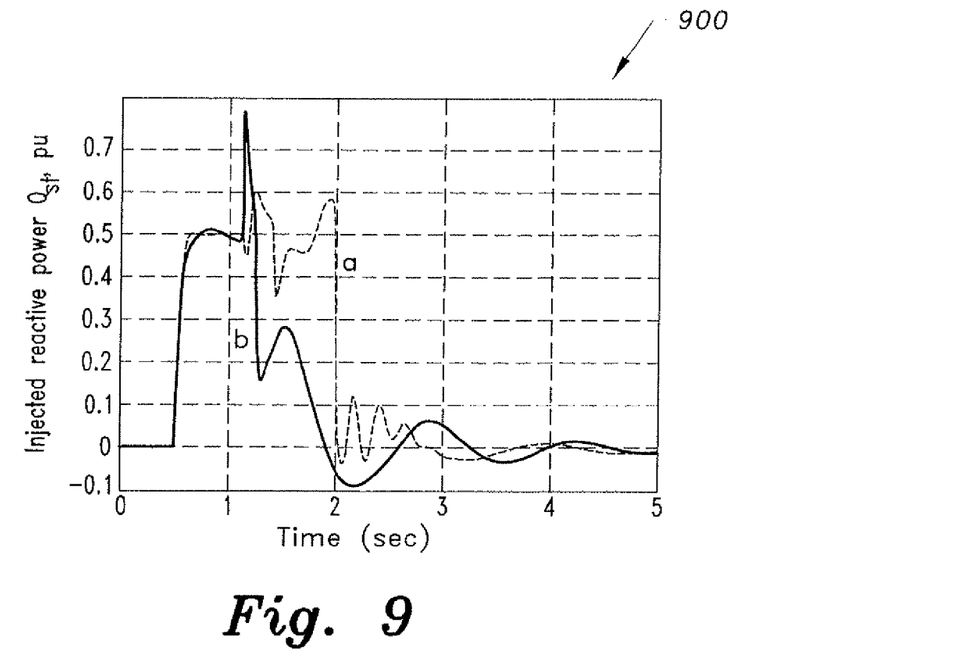
FIG. 9 is a plot showing variation in injected reactive power by the controller.

Incorporation of the SESS-based grid fault ride-through system 10 changes the situation dramatically. The STATCOM's Q controller quickly brings back the generator terminal voltage by promptly injecting required reactive power ($Q_{st}$), as can be seen from plot 900 of FIG. 9. This also keeps the rotor slip, which returns to the nominal value after a brief oscillation, under control. The induction generator 80 can continue to supply power to the grid without requiring any shutdown-and-reconnection exercise.

Figure 10:
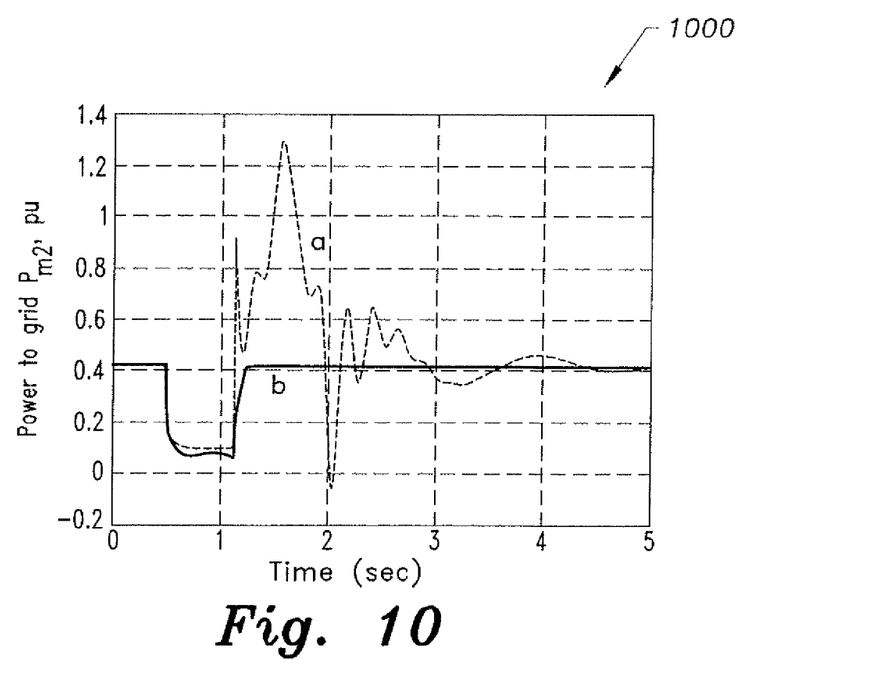
FIG. 10 is a plot showing variation in real power delivered to a grid.
Figure 11:
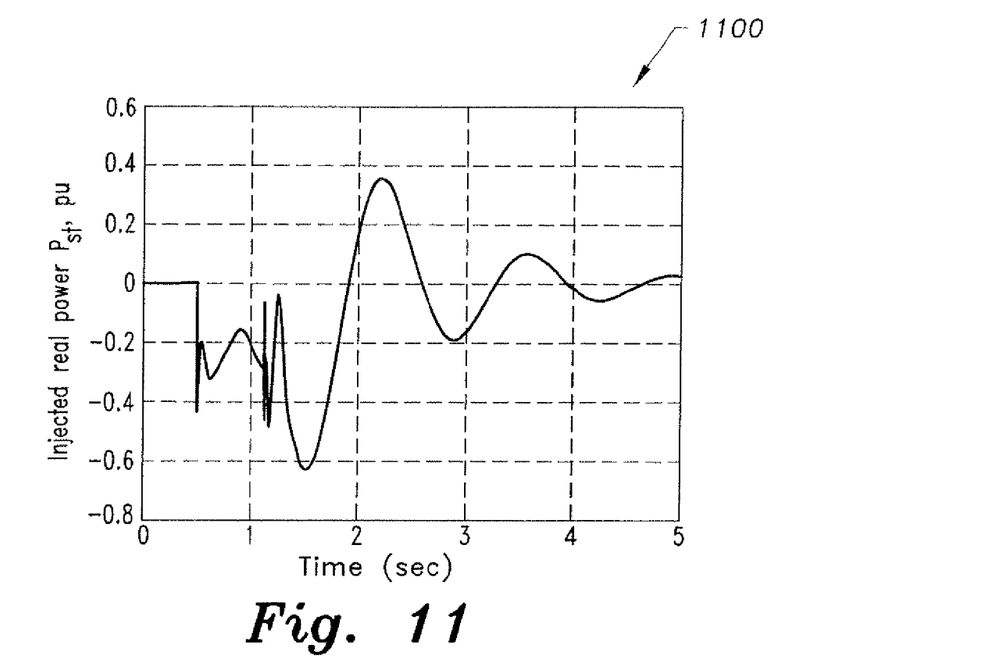
FIG. 11 is a plot showing variation in injected real power by the controller.
Figure 12:
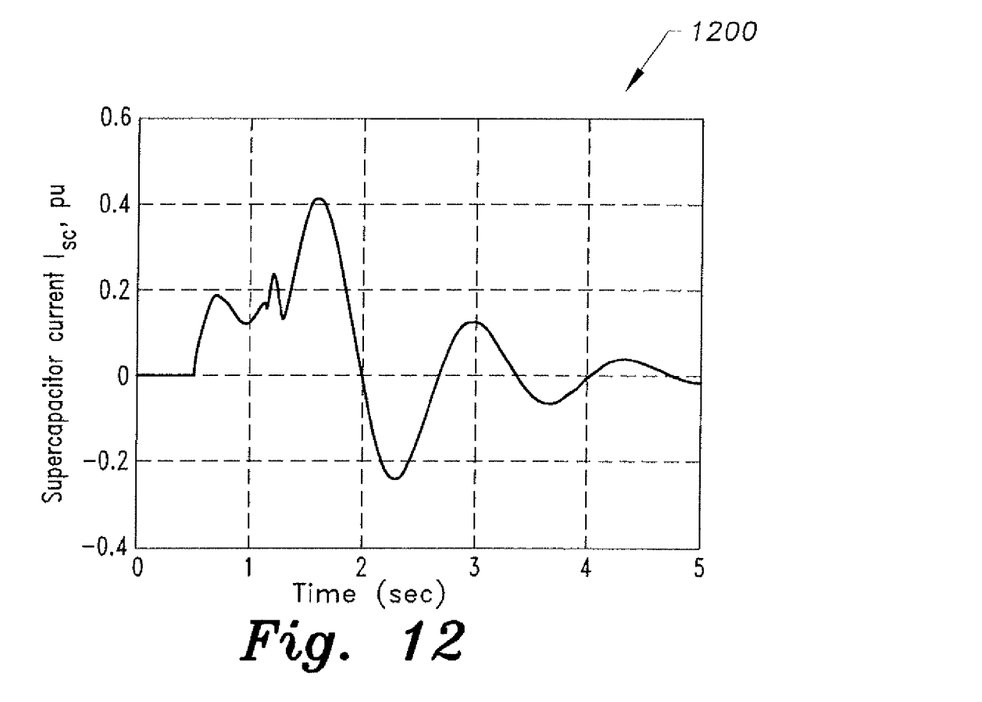
FIG. 12 is a plot showing variation in supercapacitor current.
Figure 13:
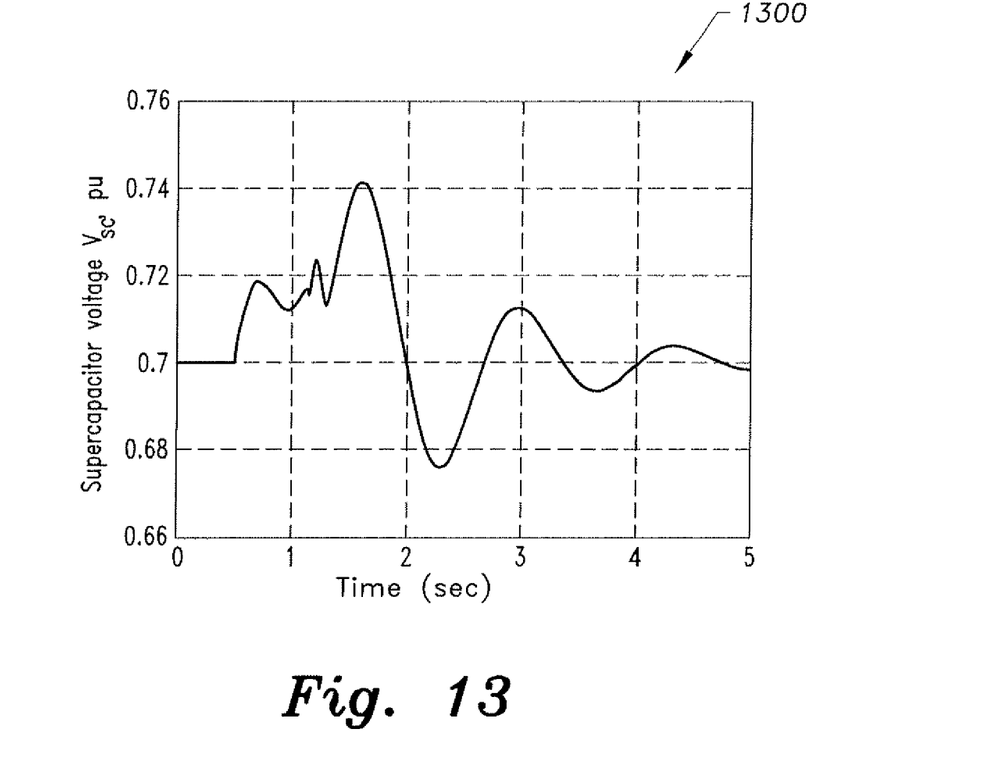
FIG. 13 is a plot showing variation in supercapacitor voltage.

The real merit of the SESS-based grid fault ride-through system 10 can be observed when it is equipped with both P and Q controllers. The P controller cooperates with the Q controller by additionally suppressing the variation of real power. With their combined action, variation of slip becomes very small, as can be seen in plot 600 of FIG. 6. Oscillations in induction generator output power and terminal voltage also are reduced significantly. More importantly, smoothed power is delivered to the grid immediately after the fault is cleared, as can be seen in plot 1000 of FIG. 10. The P controller of SESS-based grid fault ride-through system 10 injects/absorbs required real power ($P_{st}$) in opposite phase of real power variation, thereby canceling it. Plot 1100 of FIG. 11 shows the injected real power from the SESS-based grid fault ride-through system. During a fault, the STATCOM controllers 402 and 404 facilitate absorption of real power. Thus, the STATCOM control acts as a decelerating torque for the induction generator 80. Because of this absorption of real power, corresponding variation of supercapacitor current ($I_{sc}$) and voltage ($V_{sc}$) are shown in plots 1200 and 1300 of FIGS. 12 and 13, respectively.

Due to lack of voltage and frequency control capability, a conventional fixed speed induction generator (FSIG) suffers from meeting some of the important grid integration requirements, such as reactive power compensation and fault ride through. The application of the supercapacitor supported STATCOM system 10 achieves a grid compliant FSIG. The system 10 implements a decoupled P-Q control strategy for STATCOM 14. It is observed that wind-driven FSIG, when supported by supercapacitor-based grid fault ride-through system 10 for STATCOM 14, can achieve significant grid fault tolerance capability. The system 10 provides fault ride-through with very small rotor speed variation, constant terminal voltage, and resumption of smooth power delivery to the grid immediately after the fault is cleared. This demonstrates the excellent performance of the supercapacitor-based P-Q control scheme.

It is to be understood that the present invention is not limited to the embodiments described above, but encompasses any and all embodiments within the scope of the following claims.

We claim:

1. A supercapacitor-based grid fault ride-through system, comprising:
    a voltage source converter (VSC) including a DC-link input electrical circuit for receiving input electrical power from a power source, a voltage pulse width modulation (PWM) modulation index control input, a phase control input, and an output electrical circuit adapted for connection to a power grid for providing output electrical power to the power grid;
    a voltage controller connected to the voltage PWM modulation index control input;
    a current controller connected to the phase control input, said voltage controller and said current controller each being a proportional-integral (PI) controller;
    means for detecting a fault from the power grid, the means for fault detecting being connected to the voltage and current controllers, wherein said means for detecting a fault from said power grid comprises means for sensing deviation of voltage magnitude at a local bus connected to the power grid and means for sensing deviation of voltage phase angle at the local bus connected to the power grid;
    a supercapacitor having an electrical connection to the DC-link input electrical circuit of the voltage source converter, said supercapacitor providing storage of electrical energy for real and reactive power exchange;
    a bidirectional DC-DC converter including a pair of switches connected between the electrical connection of the supercapacitor and the input electrical circuit of the voltage source converter, the DC-DC bidirectional converter, via the switch pair, selectively switching the electrical connection of the supercapacitor to the voltage source converter, wherein when a fault is detected by the means for detection, responsively, the voltage and current controllers regulate the voltage source converter during a time period of the fault using the electrical energy stored in the supercapacitor, thereby enabling the voltage source converter to independently provide compensating real power and reactive power to the power grid during the fault,
    wherein each said proportional-integral (PI) controller comprises:
    means for generating a summation of a VSC output quadrature reference current and an actual VSC output quadrature current, the VSC output quadrature reference current being based on a summation of a pre-fault reference voltage and a during fault actual voltage at the local bus;
    means for generating a summation of a VSC output direct reference current and an actual VSC output direct current at the local bus, the VSC output direct reference current being based on a summation of a pre-fault reference phase angle and a during fault actual phase angle at the local bus;

means for generating a quadrature error signal $e_{xq}$ and a direct error signal $e_{xd}$ based on the quadrature VSC output current summations, the direct VSC output current summations, and an inductive reactance of the VSC; and means for generating voltage PWM modulation index and phase angle control signals based on the quadrature error signal $e_{xq}$, the direct error signal $e_{xd}$, and a voltage $V_{dc}$ at the DC-link input electrical circuitry, the PWM modulation index and phase control signals being characterized by relations:

$$m = \frac{\sqrt{e_{xd}^2 + e_{xq}^2}}{V_{dc}} \text{ and } \Psi = \tan^{-1}\left(\frac{e_{xq}}{e_{xd}}\right),$$

where m is the voltage PWM modulation control signal and $\Psi$ is the phase angle control signal; and means for routing the m and $\Psi$ control signals to the VSC, thereby controlling modulation index and phase angle defined by pulse width modulation of the VSC.

2. The supercapacitor-based grid fault ride-through system according to claim 1, wherein said bi-directional DC-DC converter is a buck-boost converter, said DC-DC converter being operable in buck mode for charging said supercapacitor and in boost mode for transferring stored energy of said supercapacitor to said voltage source converter.

3. The supercapacitor-based grid fault ride-through system according to claim 1, further comprising a wind turbine generator connected to said supercapacitor-based grid fault ride-through system and to the power grid.

4. The supercapacitor-based grid fault ride-through system according to claim 1, further comprising:
 a DC-link capacitor connected to said supercapacitor; and
 a choke inductor connected to said supercapacitor, the DC-link capacitor and the choke inductor providing energy storage capacity additional to energy storage capacity of said supercapacitor.

* * * * *